United States Patent
Dicke et al.

(10) Patent No.: US 6,318,347 B1
(45) Date of Patent: Nov. 20, 2001

(54) REMOTE MOUNTED AIR-TO-AIR AFTERCOOLER

(75) Inventors: Paul A. Dicke, Peoria; Ronald L. Dupree, Washington; Donald C. Hodges; Jiubo Ma, both of Dunlap; Aubery W. Penn, Washington, all of IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 09/607,423

(22) Filed: Jun. 29, 2000

(51) Int. Cl.$^7$ .................................................. F02B 33/00
(52) U.S. Cl. .................. 123/563; 123/41.49; 165/126; 165/41; 55/269
(58) Field of Search .............................. 123/563, 41.49; 165/126, 41; 55/269

(56) References Cited

U.S. PATENT DOCUMENTS

| | | |
|---|---|---|
| 3,752,226 | 8/1973 | Bullock . |
| 3,986,337 | 10/1976 | Richard ................ 165/126 |
| 4,059,080 | 11/1977 | Rudert . |
| 4,075,991 | 2/1978 | Mettig et al. . |
| 4,170,107 | 10/1979 | Horler ................ 123/563 X |
| 4,180,032 | 12/1979 | Plegat . |
| 4,204,848 | 5/1980 | Schulmeister et al. ........... 55/269 |
| 4,317,439 * | 3/1982 | Emmerling ................ 123/563 |
| 4,429,734 | 2/1984 | Vandervaart ................ 165/126 |
| 4,474,162 * | 10/1984 | Mason ................ 123/563 |
| 4,562,697 * | 1/1986 | Lawson ................ 123/563 |
| 4,706,737 | 11/1987 | Taylor et al. . |
| 4,832,116 | 5/1989 | Easton . |
| 4,846,258 | 7/1989 | Charles . |
| 4,878,460 * | 11/1989 | Uchida et al. ................ 123/563 |
| 4,934,449 | 6/1990 | Watt et al. ................ 165/41 |
| 4,961,404 * | 10/1990 | Iatakura et al. ................ 123/563 |
| 5,095,882 * | 3/1992 | Christensen ................ 123/563 |
| 5,234,051 * | 8/1993 | Weizenburger et al. ........... 123/563 |
| 5,316,079 * | 5/1994 | Hedeen ................ 123/563 |
| 5,337,724 * | 8/1994 | Arakawa et al. ................ 123/563 |
| 6,021,764 * | 2/2000 | Koyama ................ 123/563 |
| 6,129,056 * | 10/2000 | Skeel et al. ................ 123/41.49 |
| 6,193,772 * | 2/2001 | Wiefel ................ 55/283 |

OTHER PUBLICATIONS

Ford TW–30 Tractor With Air–to–Air Intercooled Engine Society of Automotive Engineers, Inc., 1979.
Mack's 350 HP 2234 Pount Fuel Economy Engine Society of Automotive Engineers, Inc., 1980.
Mack's New Intercoolded Six Cylinder Diesel, Maxidyne 300 Society of Automotive Engineers, Inc., 1974.

* cited by examiner

Primary Examiner—Thomas Denion
Assistant Examiner—Thai-Ba Trieu
(74) Attorney, Agent, or Firm—Larry G. Cain; J. W. Burrows

(57) ABSTRACT

An air-to-air aftercooler or heat exchanger for a vehicular internal combustion engine, which is independent of the main vehicle heat exchanger or radiator, and which is located at a position upon the vehicle which is remote from the main vehicle heat exchanger or radiator, has a filter for filtering ambient air; at least one aftercooler heat exchanger, separate from the main radiator heat exchanger and disposed upon the engine at a location remote from the main radiator heat exchanger, and having a first passageway defined therein which is fluidically connected to the filter for receiving the ambient air which has passed through the filter; a second passageway defined within the at least one aftercooler heat exchanger for receiving turbocharged air from the turbocharger, for conducting the turbocharged air through the at least one aftercooler heat exchanger such that the turbocharged air undergoes a heat exchange process with the ambient air, and for conducting the turbocharged air to the engine intake manifold; and a fan for causing the ambient air to pass through the filter and the first passageway of the at least one remote aftercooler heat exchanger, and for causing the ambient air to be discharged to atmosphere.

34 Claims, 5 Drawing Sheets

Fig 8

US 6,318,347 B1

REMOTE MOUNTED AIR-TO-AIR AFTERCOOLER

TECHNICAL FIELD

The present invention relates generally to heat exchanger or cooling systems for internal combustion engines, and more particularly to a new and improved auxiliary or supplemental heat exchanger or cooling system for use in conjunction with the main conventional heat exchanger or radiator type cooling system.

BACKGROUND ART

As is known in the internal combustion engine (ICE) art, and the motor vehicle industry employing such engines for use in the vehicle drive train, federal governmental regulations, as issued within the past years, for example, by the Environmental Protection Agency (EPA), have mandated that NOx emissions be reduced. One scheme or mode of operating internal combustion engines by means of which such NOx emissions have in fact been able to be reduced has been to incorporate exhaust gas recirculation (EGR) techniques into the engine inlet air supply system. Another scheme or mode of operating internal combustion engines by means of which such NOx emissions have also in fact been able to be reduced has been to provide increased cooling of the incoming turbocharged air being conducted into the engine inlet manifold.

One way to achieve such increased cooling of the incoming turbocharged air being conducted into the engine inlet manifold is to of course increase the size or density of the main engine heat exchanger or radiator-type cooling system whereby, in effect, more cooling surface area is provided within the heat exchanger or radiator. Conventionally, an internal combustion engine vehicle has a single or main heat exchanger or radiator-type cooling system for performing or satisfying all heat load requirements of the engine, such as, for example, those attendant the water jacket, the hydraulic systems, the power train, and the like. However, such an increase in the size or density of the main engine heat exchanger or radiator is not always possible considering size constraints or limitations for housing the main heat exchanger or radiator upon or within a particular vehicle. In addition, such an increase in the size or density of the main engine heat exchanger or radiator entails a substantial increase in the resulting pressure drop across or characteristic of such heat exchanger or radiator which, in turn, necessitates increased power input levels or requirements in order to achieve sufficient air flow through the system. Such increased power input requirements or levels can be attained or met, for example, by increasing the speed of the main engine cooling fan, however, increasing the speed of the main engine cooling fan results in unacceptable noise levels.

A need therefore exists in the art for a new and improved aftercooler or heat exchanger system which can provide sufficient or enhanced cooling of the incoming turbocharged air to be routed toward the engine inlet manifold, which will permit the size of the main or conventional heat exchanger or radiator to be maintained or reduced so as to accommodate or meet size constraints or limitations upon a particular vehicle, and which will not result in increased or elevated noise levels.

The present invention is directed to overcoming one or more of the problems set forth above.

DISCLOSURE OF THE INVENTION

In one aspect of the invention a remote-mounted cooling system is connected to an internal combustion engine. The internal combustion engine has an engine block, an air intake manifold, a turbocharger for providing inlet air to the air intake manifold, and a main radiator heat exchanger, a remote-mounted air-to-air aftercooler heat exchange system for providing cooled inlet air to the air intake manifold. The remote-mounted cooling system is comprised of a filter for filtering ambient air; at least one aftercooler heat exchanger, separate from the main radiator heat exchanger and disposed upon the engine at a location remote from the main radiator heat exchanger, and having a first passageway defined therein which is fluidically connected to the filter for receiving the ambient air which has passed through the filter; a second passageway defined within the at least one aftercooler heat exchanger for receiving turbocharged air from the turbocharger, for conducting the turbocharged air through the at least one aftercooler heat exchanger such that the turbocharged air undergoes a heat exchange process with the ambient air, and for conducting the turbocharged air to the engine intake manifold; and a fan for causing the ambient air to pass through the filter and the first passageway of the at least one remote aftercooler heat exchanger, and for causing the ambient air to be discharged to atmosphere.

In another aspect of the invention, an internal combustion engine has an engine block, an air intake manifold, a turbocharger for providing inlet air to said air intake manifold, and a main radiator heat exchanger, a remote-mounted air-to-air aftercooler heat exchange system for providing cooled inlet air to the air intake manifold, comprises: a filter for filtering ambient air; at least one aftercooler heat exchanger, separate from the main radiator heat exchanger and disposed upon the engine at a location remote from the main radiator heat exchanger, and has a first passageway defined therein which is fluidically connected to the filter for receiving the ambient air which has passed through the filter; a second passageway is defined within the at least one aftercooler heat exchanger for receiving turbocharged air from the turbocharger, for conducting the turbocharged air through the at least one aftercooler heat exchanger such that the turbocharged air undergoes a heat exchange process with the ambient air, and for conducting the turbocharged air to the engine intake manifold; and a fan for causing the ambient air to pass through the filter and the first passageway of the at least one remote aftercooler heat exchanger, and for causing the ambient air to be discharged to atmosphere.

And, in another aspect of the invention, a work machine having an internal combustion engine. The internal combustion engine is comprised of an engine block; an air intake manifold; a turbocharger for providing inlet air to the air intake manifold; a main radiator heat exchanger; and a remote-mounted air-to-air aftercooler heat exchange system for providing cooled inlet air to the air intake manifold, the remote-mounted air-to-air aftercooler has a filter for filtering ambient air; at least one aftercooler heat exchanger, separate from the main radiator heat exchanger and disposed upon the engine at a location remote from the main radiator heat exchanger, and has a first passageway defined therein which is fluidically connected to the filter for receiving the ambient air which has passed through the filter; a second passageway is defined within the at least one aftercooler heat exchanger for receiving turbocharged air from said turbocharger, for conducting the turbocharged air through the at least one aftercooler heat exchanger such that the turbocharged air undergoes a heat exchange process with the ambient air, and for conducting the turbocharged air to the engine intake manifold; and a fan for causing the ambient air to pass through the filter and the first passageway of the at least one remote aftercooler heat exchanger, and for causing the ambient air to be discharged to atmosphere.

BEST MODE FOR CARRYING OUT THE INVENTION

Figure 1:
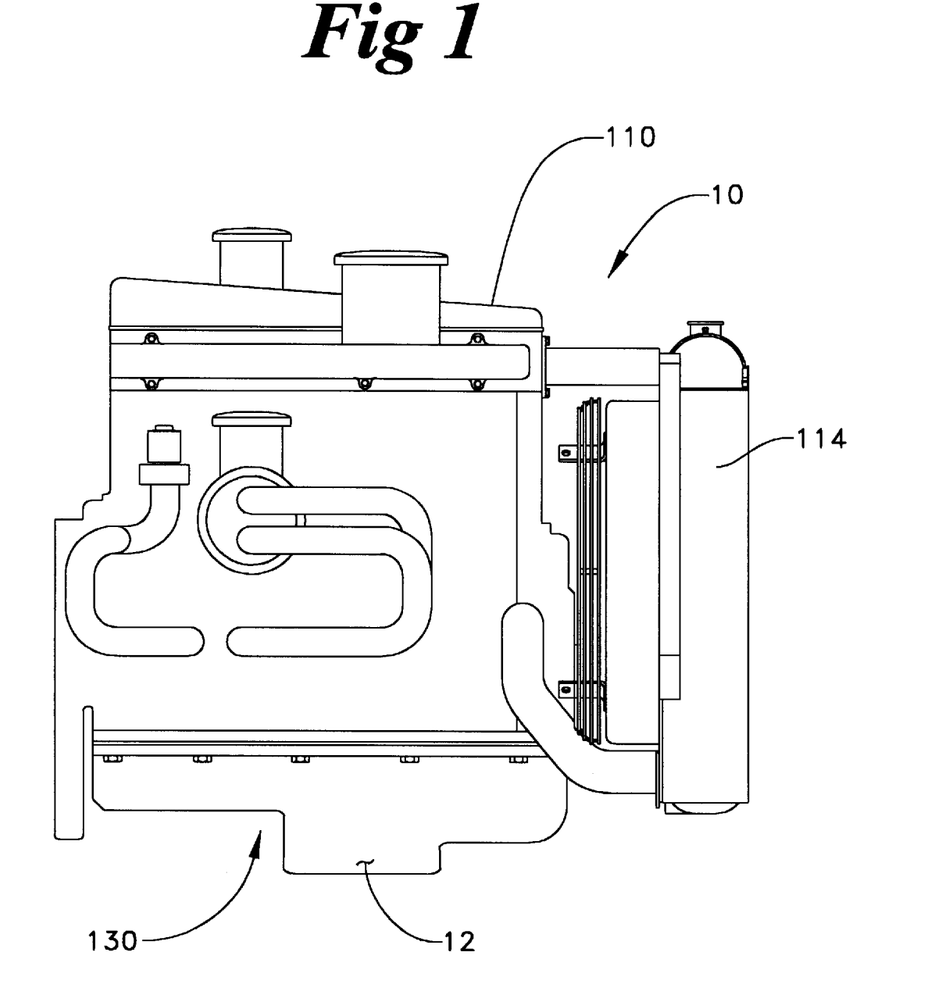
FIG. 1 is a side elevational view of a work machine 10 having a radiator cooled internal combustion diesel engine 12 modified with respect to a conventional engine so as to have incorporated thereon the new and improved remote mounted air-to-air aftercooler heat exchanger system constructed in accordance with the teachings and principles of the present invention.

It is known that a conventional radiator cooled internal combustion diesel engine 110 has an engine block, a main radiator-type heat exchanger disposed at the front end of the engine block, and a plurality of air filters for the engine intake air. The engine 110 is essentially the same as that of a conventional engine except for the inclusion therein of the new and improved remote-mounted air-to-air aftercooler heat exchange system which is constructed in accordance with the principles and teachings of the present invention and which is generally indicated by the reference character 120. It is specifically noted further that the location or disposition of the main radiator type heat exchanger 114 is unchanged with respect to a conventional engine despite the incorporation of the new and improved remote-mounted air-to-air aftercooler heat exchange system 130 within the engine 110. Consequently, it is to be further noted and appreciated that the new and improved remote-mounted air-to-air after-cooler heat exchange system 130 constructed and used in accordance with the principles and teachings of the present invention can be effectively retrofitted upon existing internal combustion engines. One of the primary features of the remote-mounted air-to-air after-cooler heat exchange system 130 of the present invention resides in the fact that such system is separate and independent from the main radiator type heat exchanger 114 conventionally utilized in connection with internal combustion engines.

Figure 2:
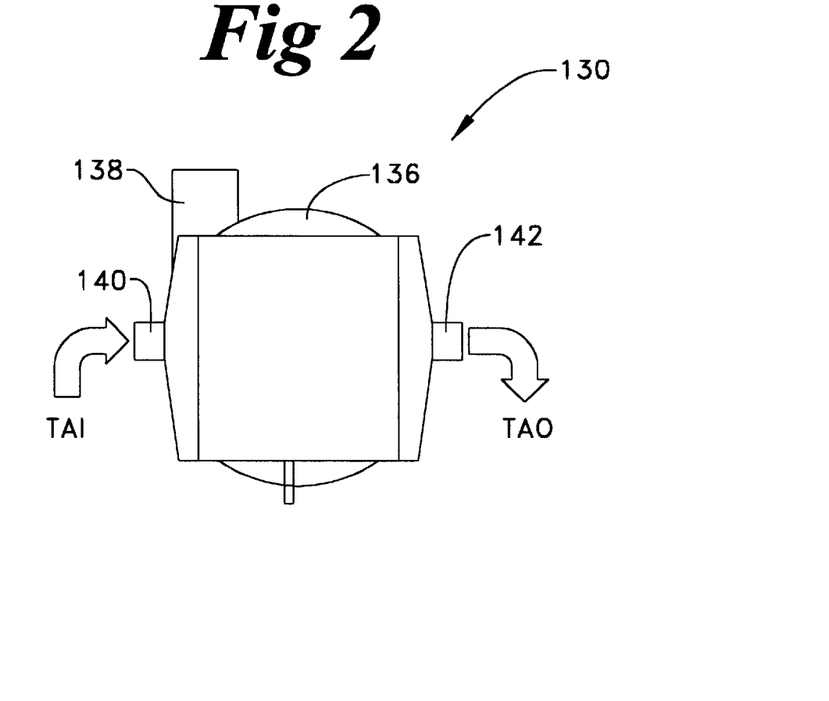
FIG. 2 is a schematic rear elevational view of a first embodiment of a remote mounted air-to-air aftercooler heat exchange system constructed in accordance with the principles and teachings of the present invention.
Figure 3:
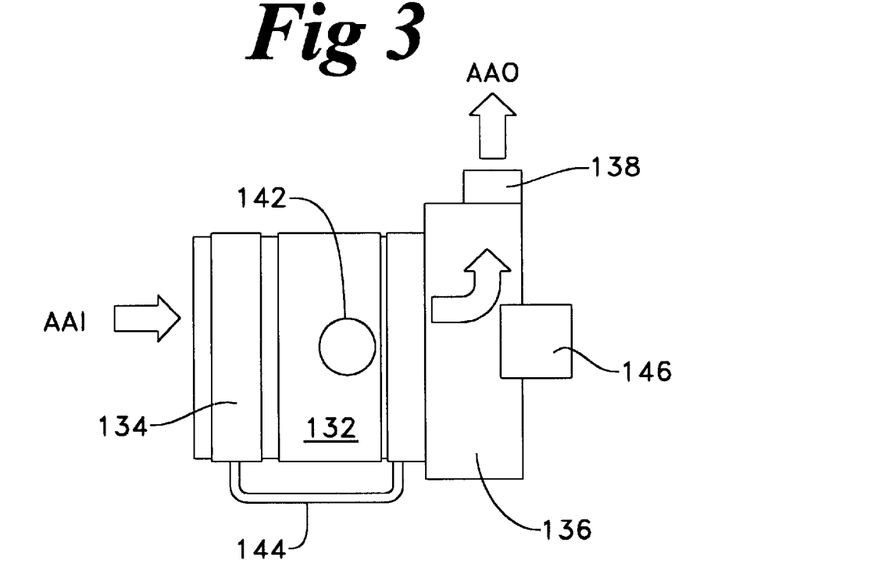
FIG. 3 is a side elevational view of the first embodiment of the remote mounted air-to-air aftercooler heat exchange system shown in FIG. 2.

Referring to FIGS. 2 and 3, an embodiment of the new and improved remote-mounted air-to-air aftercooler heat exchange system, constructed and used in accordance with the teachings and principles of the present invention, is illustrated and generally indicated by the reference character 130 as was previously noted in connection with the overall view and understanding of the internal combustion diesel engine 110 whereby it is to be understood that the particular structure of the new and improved remote-mounted air-to-air aftercooler heat exchange system 130 illustrated in FIGS. 2 and 3 can in fact be utilized as the remote-mounted air-to-air aftercooler heat exchange system 130 illustrated in FIG. 1 and accordingly incorporated within the engine 110 of FIG. 1.

More particularly, the remote-mounted air-to-air aftercooler heat exchange system 130 is seen to have a heat exchanger or aftercooler core 132 upstream of which there is provided a filter 134 through which relatively cool ambient air enters as denoted by the thick arrow AAI. Downstream of the heat exchanger or aftercooler core 132 there is disposed a heat exchanger or aftercooler fan 136 which serves to draw the relatively cool ambient air AAI through the filter 134 and the heat exchanger or aftercooler core 132 after which the ambient air is exhausted to atmosphere through an exhaust pipe 138 as relatively hot ambient air as denoted by the thick arrow AAO. Relatively hot air from the engine turbocharger is admitted into the heat exchanger or aftercooler core 132 through a heat exchanger or aftercooler inlet port 140 as denoted by the arrow TAI, and after traversing the heat exchanger or aftercooler core 132 and having undergone a heat exchange operation with respect to the relatively cool ambient air simultaneously passing through the heat exchanger or aftercooler core 132, the turbocharger air is exhausted through a heat exchanger or aftercooler outlet port 142 as relatively cool turbocharger air, denoted by the arrow TAO, which is then routed to the engine intake manifold.

The use of the filter 134 upstream of the heat exchanger or aftercooler core 132 results in clean filtered ambient air being supplied to the heat exchanger or aftercooler core 132 which permits the use of a relatively dense or compact heat exchanger or after core, as will be discussed more fully hereinafter, in view of the fact that clogging of the heat exchanger or aftercooler core by air entrained debris is effectively prevented. The use of a relatively dense or compact heat exchanger or aftercooler core enhances the cooling of the turbocharger air, which is to be routed to the engine intake manifold, which is the desirable objective. Due to the utilization of such a relatively dense or compact heat exchanger or aftercooler core, which presents a relatively considerable or significant pressure drop for the air flow drawn through the heat exchanger or aftercooler core 132 the heat exchanger or aftercooler fan 136 preferably has a radial or backward curved centrifugal fan.

In order to remove debris filtered and collected upon the filter 134 from the incoming ambient air AAI, the system 130 may further have a purge line 144 which fluidically interconnects the filter 134 to the inlet chamber of the heat exchanger or aftercooler fan 136 while circumventing or bypassing the heat exchanger or aftercooler core 132. Purge air is conducted through the filter 134 and traverses the purge line 144 so as to entrain the filtered and collected debris therewith whereby such debris can then be admitted into the fan cavity and exhausted to atmosphere through the exhaust pipe 138. Of course it is to be appreciated that additional purging routines or techniques can be employed as required or appropriate. It is further noted that the heat exchanger or aftercooler fan 136 is operatively connected to and powered by either an electric motor or a hydraulic pump and motor drive 146. The motor drive 146 thus enables the heat exchanger or aftercooler fan 136 to be driven independently of the vehicle engine speed and the speed of the main radiator cooling fan. Thus, a constant flow or controlled flow of the ambient air drawn through the heat exchanger or aftercooler core 132 is able to be achieved.

Figure 4:
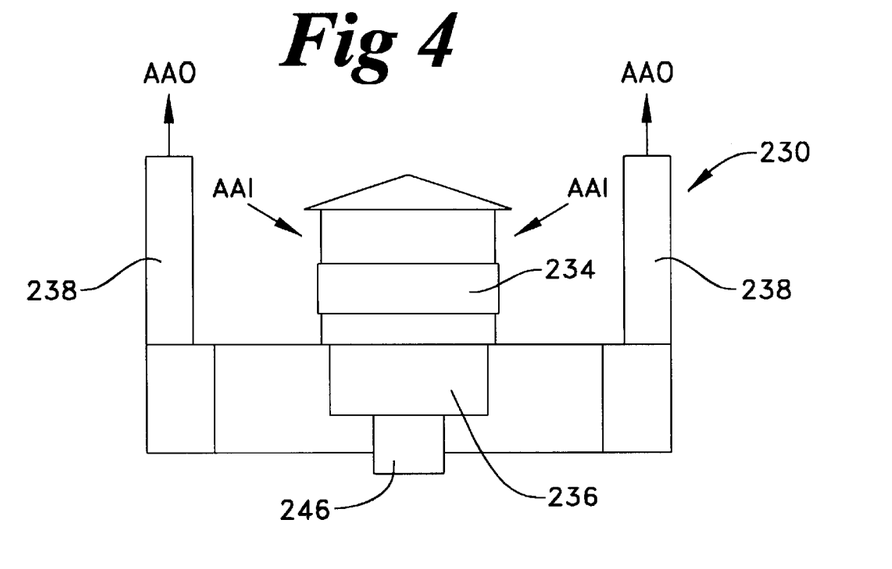
FIG. 4 is a schematic front elevational view a second embodiment of a remote mounted air-to-air aftercooler heat exchange system constructed in accordance with the principles and teachings of the present invention.
Figure 5:
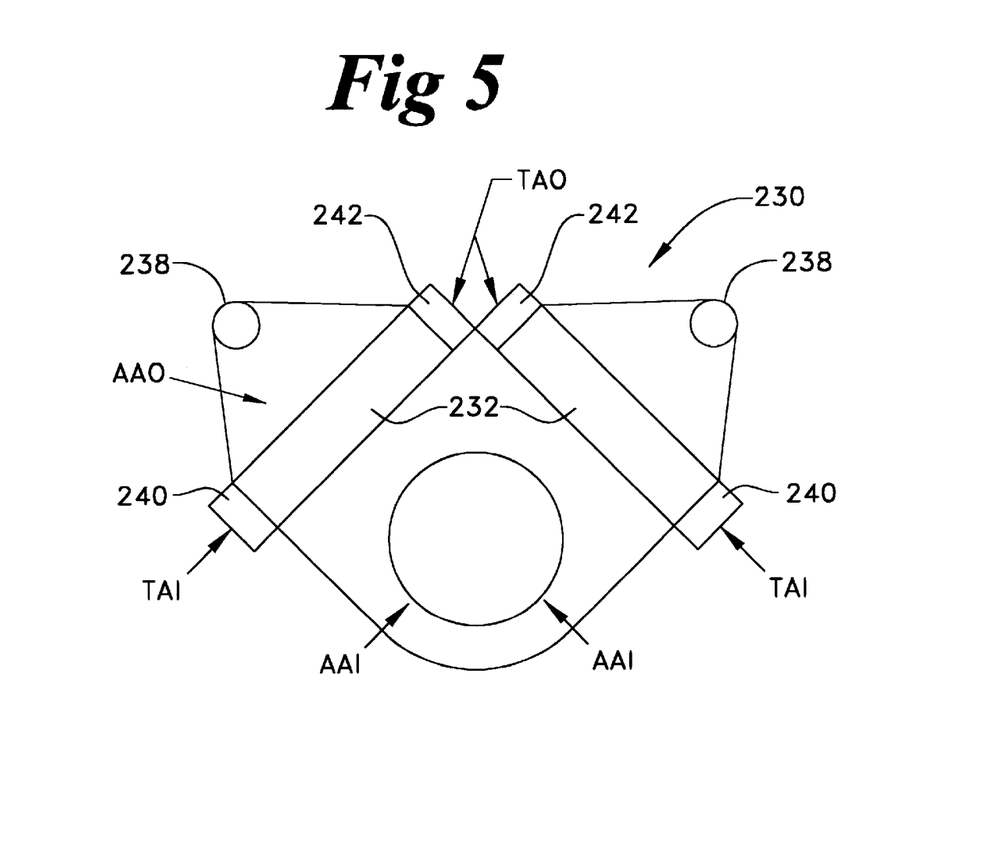
FIG. 5 is a top plan view of the second embodiment of the remote mounted air-to-air aftercooler heat exchange system shown in FIG. 4.

In FIGS. 4 and 5, a second embodiment of the new and improved remote-mounted air-to-air aftercooler heat exchange system, constructed and used in accordance with the principles and teachings of the present invention, is illustrated and generally indicated by the reference character 230. It is noted that the remote-mounted air-to-air aftercooler heat exchange system 230 is operatively similar to the remote-mounted air-to-air aftercooler heat exchange system 130 illustrated in FIGS. 2 and 3, and therefore, parts of the remote-mounted air-to-air aftercooler heat exchanger system 230 which correspond to similar parts of the remote-mounted air-to-air aftercooler heat exchange system 130 of the first embodiment as illustrated in FIGS. 2 and 3 have been designated by similar reference characters, although the reference characters of the remote-mounted air-to-air aftercooler heat exchanger system 230 are noted as being within the 200 series. As will also be appreciated from a comparison between the embodiment of FIGS. 2 and 3, and the embodiment of FIGS. 4 and 5, there are structural differences between the two aftercooler heat exchange systems 130 and 230.

More particularly, one of the first major differences between the remote-mounted air-to-air aftercooler heat exchanger system 230 of FIGS. 4 and 5, and the remote-mounted air-to-air aftercooler heat exchanger system 130 of FIGS. 2 and 3, is that in lieu of a single heat exchanger or aftercooler core 132, the remote-mounted air-to-air aftercooler heat exchanger system 230 has a pair of heat exchangers or aftercoolers 232 respectively disposed upon opposite sides of a heat exchanger or aftercooler fan 236.

A filter 234 is coaxially disposed above the fan 236 such that the ambient air is drawn into and through the filter 234 by the fan 236, as denoted by the arrow AAI, and the fan 236 has dual outlets such that the exhausts of the fan 236 are respectively blown through each one of the heat exchangers or aftercoolers 232 which are respectively located directly adjacent to and downstream of the fan outlets. This feature has another difference with respect to the system 130 of FIGS. 2 and 3, that is, in lieu of the after-cooler fan air being drawn through the heat exchangers or aftercoolers as was the case of the system 130 of FIGS. 2 and 3, the exhaust fan air is blown through the heat exchangers or aftercoolers 232.

Subsequently, the heated ambient air is exhausted from the heat exchangers or aftercoolers 232 and discharged into the atmosphere through an exhaust pipe 238 as ambient air out AAO. In a similar manner, air from the engine turbocharger is admitted into remotely located inlet ends 240 of the heat exchangers or aftercoolers 232 as denoted by the arrows TAI, and after having passed through the respective heat exchangers or aftercoolers 232 so as to have undergone a heat exchange process with respect to the ambient air, the relatively cooled turbocharged air is exhausted from adjacent outlet ends 242 of the heat exchangers or aftercoolers 232 as denoted by the arrows TAO.

Figure 6:
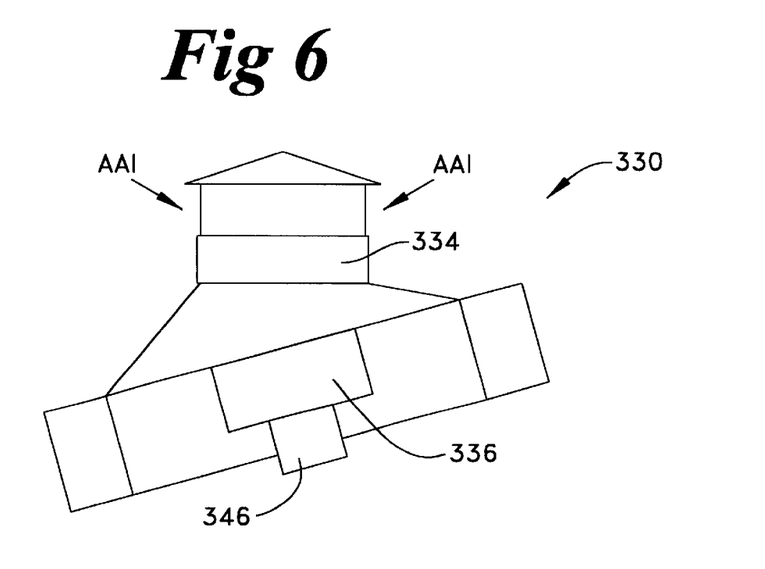
FIG. 6 is a schematic front elevational view similar to that of FIG. 4 showing, however, a third embodiment of a remote mounted air-to-air aftercooler heat exchange system constructed in accordance with the principles and teachings of the present invention.
Figure 7:
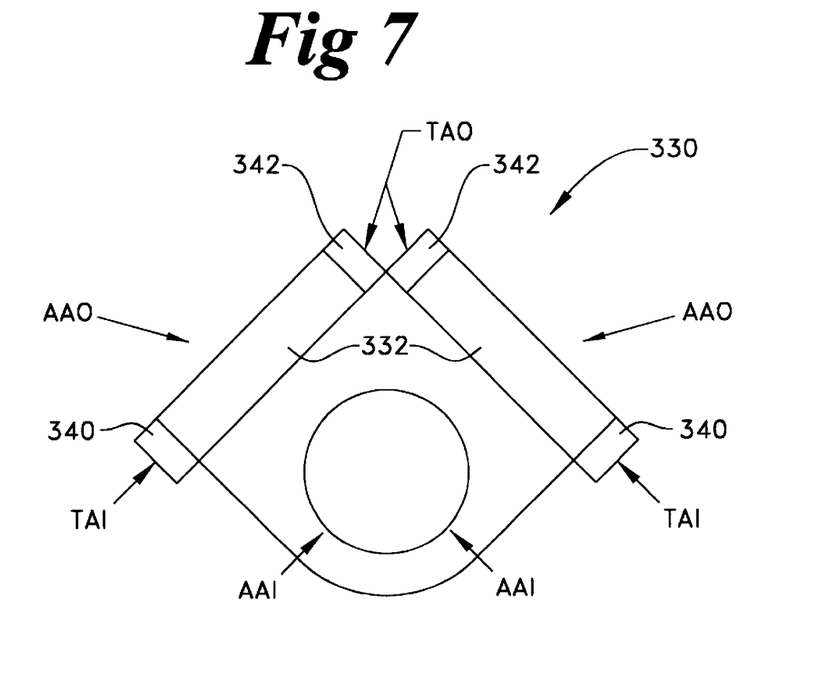
FIG. 7 is a top plan view similar to that of FIG. 5 showing, however, the third embodiment of the remote mounted air-to-air aftercooler heat exchange system shown in FIG. 6.

With reference to FIGS. 6 and 7, another embodiment of the new and improved remote-mounted air-to-air aftercooler heat exchange system, constructed and used in accordance with the principles and teachings of the present invention, is illustrated and generally indicated by the reference character 330. It is noted that the remote-mounted air-to-air aftercooler heat exchange system 330 is operatively similar to the remote-mounted air-to-air aftercooler heat exchange systems 130 and 230 illustrated in FIGS. 2-5, and therefore, parts of the remote-mounted air-to-air aftercooler heat exchanger system 330 which correspond to similar parts of the remote-mounted air-to-air aftercooler heat exchange systems 130 and 230 of the first and second embodiments as illustrated in FIGS. 2-5 have been designated by similar reference characters, although the reference characters of the remote-mounted air-to-air aftercooler heat exchanger system 330 are noted as being within the 300 series. As will also be appreciated from a comparison between the embodiment of FIGS. 4 and 5, and the embodiment of FIGS. 6 and 7, there are structural or positional differences between the components of the two aftercooler heat exchange systems 230 and 330.

More particularly, one of the first differences between the remote-mounted air-to-air aftercooler heat exchanger system 330 of FIGS. 6 and 7, and the remote-mounted air-to-air aftercooler heat exchanger system 230 disclosed within FIGS. 4 and 5, is that in accordance with the principles and teachings of the embodiment of the remote-mounted air-to-air aftercooler heat exchanger system disclosed within FIGS. 6 and 7, while the axis of a filter 334 is disposed vertically, the axis of a fan 336 and its drive motor 346 is offset or disposed at a predetermined angle with respect to the vertical axis of the filter 334. It is additionally noted that a second difference between the remote-mounted air-to-air aftercooler heat exchanger system 330 disclosed within FIGS. 6 and 7, and the remote-mounted air-to-air aftercooler heat exchanger system 230 disclosed within FIGS. 4 and 5, is that the exhaust pipes 238 of the embodiment of the remote-mounted air-to-air aftercooler heat exchanger system 230 disclosed within FIGS. 4 and 5 have in effect been eliminated.

It is lastly to be understood that in connection with any one of the remote-mounted air-to-air heat exchangers or aftercoolers 132, 232, or 332 respectively disclosed within the embodiments of FIGS. 2-3, FIGS. 4-5, and FIGS. 6-7, that such heat exchanger or aftercooler can in fact have either a primary surface heat exchanger or a more conventional secondary surface heat exchanger, although for the purposes of this disclosure and invention, a primary surface heat exchanger or aftercooler is preferred. A secondary surface heat exchanger is one in which a tubular pipe or conduit, carrying a fluid to be cooled, has a plurality of radiator fins projecting radially outwardly from the external peripheral surface of the tubular pipe or conduit. A primary surface heat exchanger is one in which the radiator fins have in effect been eliminated and in lieu thereof, interdigitated conduits for the respective gas and air flows are defined between corrugated sheet components which together form the heat exchanger. The density of the heat exchange components is thus increased resulting in enhanced cooling.

Figure 8:
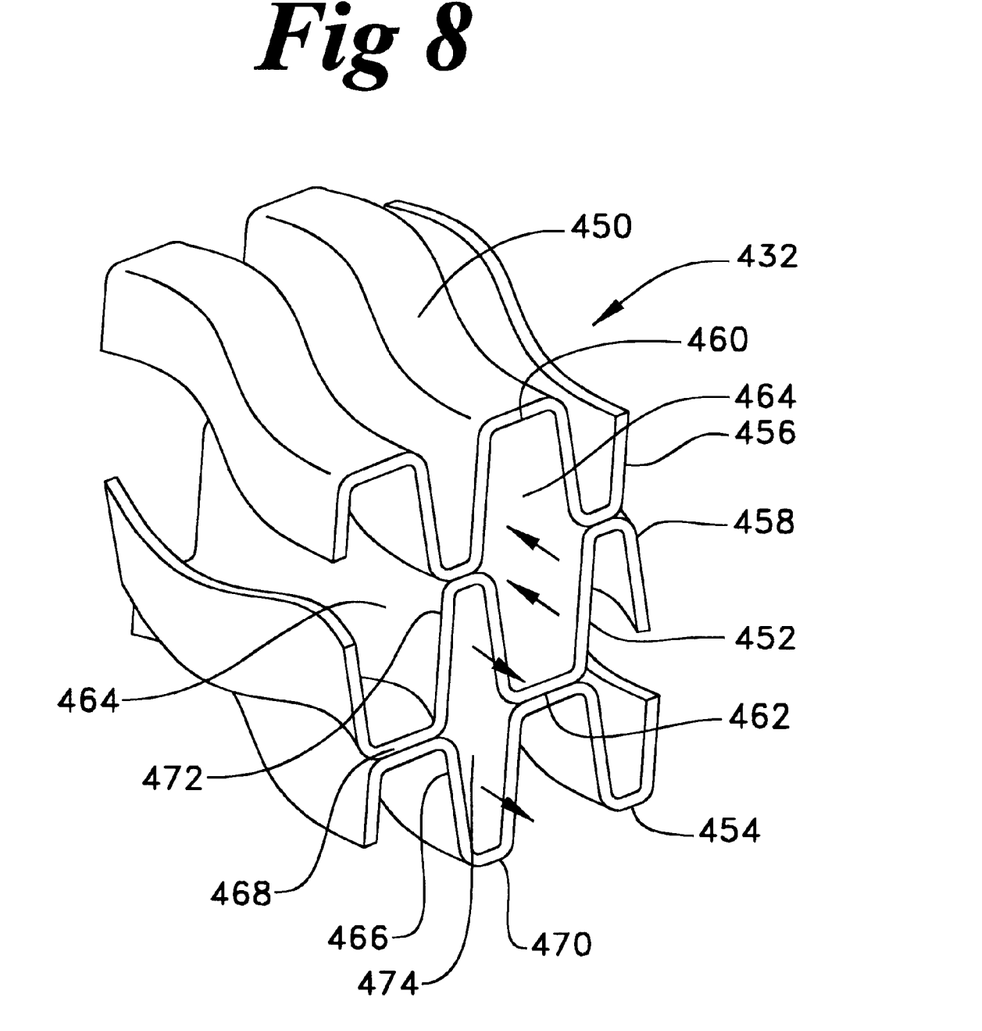
FIG. 8 is a schematic perspective view showing a primary surface-type heat exchanger which can be used as the heat exchanger component within any one of the remote mounted air-to-air aftercooler system embodiments illustrated in FIGS. 2–7.

More particularly, as seen in FIG. 8, there is disclosed a primary surface heat exchanger which is generally indicated by the reference character 432. The heat exchanged is seen to be formed from three vertically stacked corrugated sheets of material 450, 452, and 454. The corrugated sheets may be formed from any one of a plurality of materials, such as, for example, stainless steel, aluminum, non-metallic materials, such as, for example, nylon or other thermoplastic materials, or the like. The upper corrugated sheet 450 and the intermediate corrugated sheet 452 are disposed in an opposite sense or orientation with respect to each other so as not to be nested and wherein the respective concave portions 456 and 458 of the sheets 450 and 452 are in abutment with each other, while the respective convex portions 460 and 462 of the sheets 450 and 452 are disposed remote from each other. In this manner, the upper and intermediate sheets 450 and 452 define a plurality of gas conduits 464 therebetween.

In a similar manner, the lower corrugated sheet 454 and the intermediate corrugated sheet 452 are disposed in an opposite sense or orientation with respect to each other so as not to be nested and wherein the respective concave portions 466 and 468 of the sheets 454 and 452 are in abutment with each other, while the respective convex portions 470 and 472 of the sheets 454 and 452 are disposed remote from each other. In this manner, the lower and intermediate sheets 454 and 452 define a plurality of air conduits 474 therebetween. It is also to be appreciated that as a result of the arrangement of the sheets 450,452,454, and the respective formation of the gas and air conduits 464 and 474 therebetween, that, for example, the upper end portion of each one of the air conduits 474 is partially interdigitated between the lower end portions of a pair of adjacent gas conduits 464, and similarly, considered from a reverse point of view, the lower end portion of each one of the gas conduits 464 is partially interdigitated between the upper end portions of a pair of adjacent air conduits 474. In this manner, enhanced heat exchange between the air and gas flowing within the conduits 474 and 464 is achieved.

Industrial Applicability

It is thus to be appreciated that as a result of the provision or arrangement of the remote-mounted air-to-air aftercooler or heat exchanger system of the present invention as utilized in conjunction with, for example, a diesel type internal combustion engine as disclosed within FIG. 1, and regardless of whether the remote-mounted air-to-air aftercooler or heat exchanger arrangement has the particular structural arrangement having an embodiment disclosed within FIGS. 2–3, another embodiment disclosed within FIGS. 4–5, or another embodiment disclosed within FIGS. 6–7, various operational advantages are able to be achieved. It is initially noted, for example, that with the new and improved remote-mounted air-to-air aftercooler or heat exchanger arrangement constructed and used in accordance with the principles and teachings of the present invention, additional cooling is provided for cooling the incoming air to the engine intake manifold without requiring such cooling to be affected by the main cooling heat exchanger or radiator which is then free to perform the other cooling functions, or address other cooling loads, of the engine. Sufficient air flow and cooling of the incoming air to the engine intake manifold is therefore achieved without necessitating an increase in the size and operational noise of the main cooling heat exchanger or radiator. Alternatively, the size of the main cooling heat exchanger or radiator can be reduced. The fan of the remote-mounted air-to-air aftercooler or heat exchanger system is also driven by an apparatus, such as its own motor drive so as to be able to be operated independently of the engine speed or load.

Still further, the utilization of the remote-mounted air-to-air aftercooler or heat exchanger system as disclosed herein permits such system to be mounted in effect as a retrofitted system with respect to existing or conventional vehicle heat exchanger arrangements or systems. In accordance with the various illustrated embodiments, it is also to be appreciated that when the heated ambient air is exhausted to atmosphere, such heated air is directed away from both the aftercooler and main radiator fans so as not to be ingested into the intake or incoming air streams of either fan. In connection with such an arrangement, it is noted, for example, that while the exhaust pipes 238,238 of the second embodiment disclosed within FIGS. 4 and 5 are disclosed and illustrated as extending vertically upwardly, they may also be disposed so as to extend horizontally as long as the exhaust ends of the pipes are remote from both the aftercooler and main radiator fans. Further, the advantage of the arrangement of the remote air-to-air aftercooler or heat exchanger systems disclosed within the various embodiments as illustrated in FIGS. 4–7 wherein two aftercooler or heat exchange cores 232,232 and 332,332 are employed in lieu of the single aftercooler or heat exchanger core 132 of the first embodiment illustrated in FIGS. 2–3 is that more flexibility with respect to the system components, and the positional housing or accommodation of the same upon the vehicle, is able to be achieved.

What is claimed is:

1. A remote-mounted cooling system being connected to an internal combustion engine, said internal combustion engine having an engine block, an air intake manifold, a turbocharger for providing inlet air to the air intake manifold, and a main radiator heat exchanger, a remote-mounted air-to-air aftercooler heat exchange system for providing cooled inlet air to the air intake manifold, said remote-mounted cooling system comprising:

a filter for filtering ambient air;

at least one aftercooler heat exchanger, separate from the main radiator heat exchanger and disposed upon the engine at a location remote from the main radiator heat exchanger, and having a first enclosed passageway defined therein which is fluidically connected to said filter for receiving said ambient air which has passed through said filter;

a second enclosed passageway defined within said at least one aftercooler heat exchanger adjacent the first enclosed passageway and operative to receive turbocharged air from the turbocharger, conduct said turbocharged air through said at least one aftercooler heat exchanger such that said turbocharged air undergoes a heat exchange process with said ambient air, and conduct said turbocharged air to the engine intake manifold; and a fan for causing said ambient air to pass through said filter and said first passageway of said at least one remote aftercooler heat exchanger, and for causing said ambient air to be discharged to atmosphere.

2. The remote-mounted cooling system of claim 1, wherein said air-to-air aftercooler heat exchanger system includes:

said fan includes a centrifugal fan.

3. The remote-mounted cooling system of claim 1, wherein said air-to-air aftercooler heat exchanger system includes:

said filter and said at least one aftercooler heat exchanger are disposed upstream of said fan such that said fan draws said ambient air through said filter and said at least one aftercooler heat exchanger.

4. The remote-mounted cooling system of claim 3, wherein said air-to-air aftercooler heat exchanger system includes:

a purge line fluidically interconnecting said filter and said fan, and bypassing said at least one aftercooler heat exchanger, for conducting filter purging air from said filter to said fan for discharge of debris collected within said filter along with said ambient air discharged to atmosphere.

5. The remote-mounted cooling system of claim 3, where said air-to-air aftercooler heat exchanger system includes:

an exhaust pipe fluidically connected to said fan for discharging said ambient air to atmosphere such that said discharged ambient air is directed away from the main radiator heat exchanger.

6. The remote-mounted cooling system of claim 1 wherein said air-to-air aftercooler heat exchanger system includes:

said fan is interposed said filter and said at least one aftercooler heat exchanger such that said fan draws said ambient air through said filter and forces said ambient air through said at least one aftercooler heat exchanger which is fluidically disposed downstream of said fan.

7. The remote-mounted cooling system of claim 6, wherein said air-to-air aftercooler heat exchanger system includes:

said at least one aftercooler heat exchanger includes two aftercooler heat exchangers disposed upon opposite sides of said fan.

8. The remote-mounted cooling system of claim 7, wherein said air-to-air aftercooler heat exchanger system includes:

an exhaust pipe fluidically connected to each one of said two aftercooler heat exchangers such that said discharged ambient air is directed away from the main radiator heat exchanger.

9. The remote-mounted cooling system of claim 7, wherein said air-to-air aftercooler heat exchanger system includes:

said filter has an axis defined therethrough; and said fan has an axis defined therethrough, said axis of said fan being angularly offset with respect to said axis of said filter so as to facilitate accommodation of said heat exchanger system within space limitations of the vehicular engine.

10. The remote-mounted cooling system of claim 1, wherein said air-to-air aftercooler heat exchanger system includes:

a motor drive operatively connected to said fan for driving said fan independently of the load and speed of the vehicular engine.

11. The remote-mounted cooling system of claim 1, wherein said remote aftercooler heat exchanger includes a primary surface-type heat exchanger having three sheets of corrugated material defining two interdigitated fluid passageways therebetween for said ambient air and said turbocharged air wherein a portion of a first one of said two fluid passageways is interposed portions of a second one of said two fluid passageways while a portion of said second one of said two fluid passageways is interposed portions of said first one of said two passageways so as to enhance said heat exchange process between said ambient air and said turbocharged air.

12. An internal combustion engine having an engine block, an air intake manifold, a turbocharger for providing inlet air to said air intake manifold, and a main radiator heat exchanger, a remote-mounted air-to-air aftercooler heat exchange system for providing cooled inlet air to said air intake manifold, comprising:

a filter for filtering ambient air;

at least one aftercooler heat exchanger, separate from said main radiator heat exchanger and disposed upon said engine at a location remote from said main radiator heat exchanger, and having a first enclosed passageway defined therein which is fluidically connected to said filter for receiving said ambient air which has passed through said filter;

a second enclosed passageway defined within said at least one aftercooler heat exchanger adjacent to the first enclosed passageway and operative to receive turbocharged air from said turbocharger, conduct said turbocharged air through said at least one aftercooler heat exchanger such that said turbocharged air undergoes a heat exchange process with said ambient air, and conduct said turbocharged air to said engine intake manifold; and a fan for causing said ambient air to pass through said filter and said first passageway of said at least one remote aftercooler heat exchanger, and for causing said ambient air to be discharged to atmosphere.

13. The internal combustion engine of claim 12, wherein:

said fan includes a centrifugal fan.

14. The internal combustion engine of claim 12, wherein:

said filter and said at least one aftercooler heat exchanger are disposed upstream of said fan such that said fan draws said ambient air through said filter and said at least one aftercooler heat exchanger.

15. The internal combustion engine of claim 14, wherein:

a purge line fluidically interconnecting said filter and said fan, and bypassing said at least one aftercooler heat exchanger, for conducting filter purging air from said filter to said fan for discharge of debris collected within said filter along with said ambient air discharged to atmosphere.

16. The internal combustion engine of claim 14, wherein:

an exhaust pipe fluidically connected to said fan for discharging said ambient air to atmosphere such that said discharged ambient air is directed away from the main radiator heat exchanger.

17. The internal combustion engine of claim 12, wherein:

said fan is interposed said filter and said at least one aftercooler heat exchanger such that said fan draws said ambient air through said filter and forces said ambient air through said at least one aftercooler heat exchanger which is fluidically disposed downstream of said fan.

18. The internal combustion engine of claim 17, wherein:

said at least one aftercooler heat exchanger includes two aftercooler heat exchangers disposed upon opposite sides of said fan.

19. The internal combustion engine of claim 18, wherein:

an exhaust pipe fluidically connected to each one of said two aftercooler heat exchangers such that said discharged ambient air is directed away from the main radiator heat exchanger.

20. The internal combustion engine of claim 18, wherein:

said filter has an axis defined therethrough; and said fan has an axis defined therethrough, said axis of said fan being angularly offset with respect to said axis of said filter so as to facilitate accommodation of said heat exchanger system within space limitations of the vehicular engine.

21. The internal combustion engine of claim 12, wherein:

a motor drive operatively connected to said fan for driving said fan independently of the load and speed of the vehicular engine.

22. The internal combustion engine of claim 12, wherein said remote aftercooler heat exchanger includes a primary surface-type heat exchanger having three sheets of corrugated material defining two interdigitated fluid passageways therebetween for said ambient air and said turbocharged air wherein a portion of a first one of said two fluid passageways is interposed portions of a second one of said two fluid passageways while a portion of said second one of said two fluid passageways is interposed portions of said first one of said two passageways so as to enhance said heat exchange process between said ambient air and said turbocharged air.

23. A work machine having an internal combustion engine, said internal combustion engine comprising:

an engine block;

an air intake manifold;

a turbocharger for providing inlet air to said air intake manifold;

a main radiator heat exchanger; and a remote-mounted air-to-air aftercooler heat exchange system for providing cooled inlet air to said air intake manifold, said remote-mounted air-to-air aftercooler having a filter for filtering ambient air; at least one aftercooler heat exchanger, separate from said main radiator heat exchanger and disposed upon said engine at a location remote from said main radiator heat exchanger, and having a first enclosed passageway defined therein which is fluidically connected to said filter for receiving said ambient air which has passed through said filter; a second enclosed passageway defined within said at least one aftercooler heat exchanger adjacent to the first enclosed passageway and operative to receive turbocharged air from said turbocharger, conduct said turbocharged air through said at least one after-cooler heat exchanger such that said turbocharged air undergoes a heat exchange process with said ambient air, and conduct said turbocharged air to said engine intake manifold; and a fan for causing said ambient air to pass through said filter and said first passageway of said at least one remote aftercooler heat exchanger, and for causing said ambient air to be discharged to atmosphere.

24. The work machine as set forth in claim 23, wherein: said fan includes a centrifugal fan.

25. The work machine as set forth in claim 23, wherein; said filter and said at least one aftercooler heat exchanger are disposed upstream of said fan such that said fan draws said ambient air through said filter and said at least one aftercooler heat exchanger.

26. The work machine as set forth in claim 25, including: a purge line fluidically interconnecting said filter and said fan, and bypassing said at least one aftercooler heat exchanger, for conducting filter purging air from said filter to said fan for discharge of debris collected within said filter along with said ambient air discharged to atmosphere.

27. The work machine as set forth in claim 25, including:

an exhaust pipe fluidically connected to said fan for discharging said ambient air to atmosphere such that said discharged ambient air is directed away from the main radiator heat exchanger.

28. The work machine as set forth in claim 23, wherein:

said fan is interposed said filter and said at least one aftercooler heat exchanger such that said fan draws said ambient air through said filter and forces said ambient air through said at least one aftercooler heat exchanger.

29. The work machine as set forth in claim 28, wherein:

said at least one aftercooler heat exchanger includes two aftercooler heat exchangers disposed upon opposite sides of said fan.

30. The work machine as set forth in claim 29, including:

an exhaust pipe fluidically connected to each one of said two aftercooler heat exchangers such that said discharged ambient air is directed away from the main radiator heat exchanger.

31. The work machine as set forth in claim 29, wherein:

said filter has an axis defined therethrough; and said fan has an axis defined therethrough, said axis of said fan being angularly offset with respect to said axis of said filter so as to facilitate accommodation of said heat exchanger system within space limitations of the vehicular engine.

32. The work machine as set forth in claim 23, including:

a motor drive operatively connected to said fan for driving said fan independently of the load and speed of the vehicular engine.

33. The work machine as set forth in claim 23, wherein said remote aftercooler heat exchanger includes a primary surface-type heat exchanger having three sheets of corrugated material defining two interdigitated fluid passageways therebetween for said ambient air and said turbocharged air wherein a portion of a first one of said two fluid passageways is interposed portions of a second one of said two fluid passageways while a portion of said second one of said two fluid passageways is interposed portions of said first one of said two passageways so as to enhance said heat exchange process between said ambient air and said turbocharged air.

34. The work machine as set forth in claim 27, wherein:

said corrugated material including said primary surface-type heat exchanger being a material selected from the group including stainless steel, aluminum, and a thermoplastic resin material.

* * * * *